United States Patent [19]

Sumi

[11] 4,248,047
[45] Feb. 3, 1981

[54] EXHAUST BYPASS VALVE ASSEMBLY FOR AN EXHAUST GAS TURBO-SUPERCHARGER

[75] Inventor: Yasuo Sumi, Yokohama, Japan
[73] Assignee: Nissan Motor Company, Limited, Yokohama, Japan
[21] Appl. No.: 48,846
[22] Filed: Jun. 15, 1979
[30] Foreign Application Priority Data Nov. 18, 1978 [JP] Japan ................................ 53-142746

[51] Int. Cl.³ ............................................ F02B 37/00
[52] U.S. Cl. ........................................................ 60/602
[58] Field of Search .................. 60/600, 601, 602, 603
[56] References Cited

U.S. PATENT DOCUMENTS 3,941,035  3/1976  Mueller .................................. 60/602

FOREIGN PATENT DOCUMENTS 2716470  10/1978  Fed. Rep. of Germany ............ 60/602

*Primary Examiner*—Michael Koczo
*Attorney, Agent, or Firm*—Schwartz, Jeffery, Schwaab, Mack, Blumenthal & Koch

[57] ABSTRACT

An exhaust bypass valve assembly for an internal combustion engine including a throttle valve downstream of a compressor of an exhaust gas turbo-supercharger for controlling intake mixture flows, a bypass causing part of exhaust gases to flow therethrough without passing through an exhaust gas turbine and an exhaust bypass valve provided in said bypass comprises a first diaphragm device adapted to be operated by a pressure upstream of the throttle valve to open the exhaust bypass valve and a second diaphragm device adapted to be operated by a pressure difference across the throttle valve to open the exhaust bypass valve. The first and second diaphragm devices are arranged in series with a rod of the exhaust bypass valve. With this arrangement according to the invention, the bypass valve is opened by the difference pressure across the throttle valve during an operation of an engine under a partially loaded condition, thereby rendering smooth the exhaust gas flow to improve the combustion of fuel mixture.

6 Claims, 4 Drawing Figures

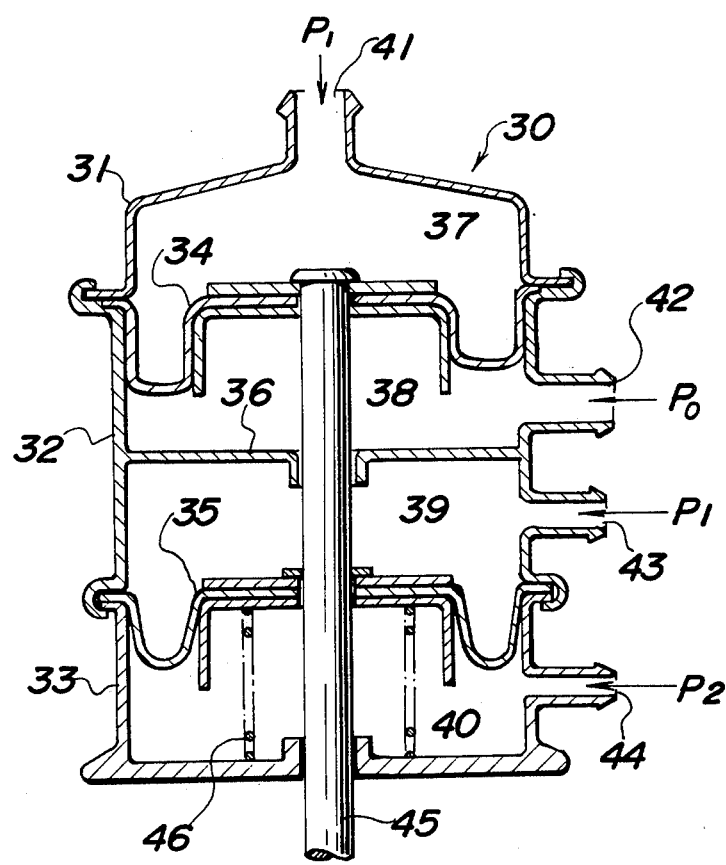

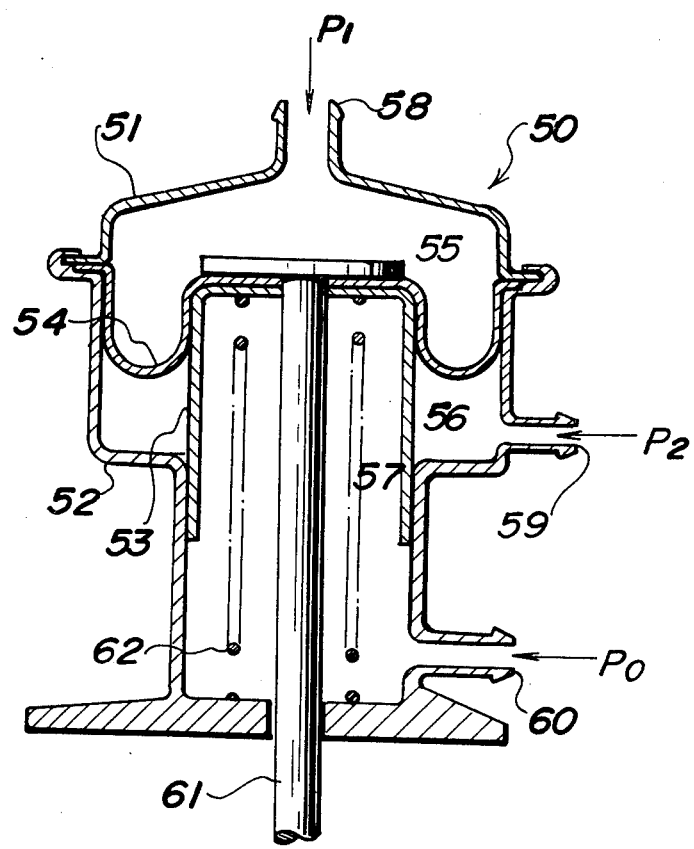

EXHAUST BYPASS VALVE ASSEMBLY FOR AN EXHAUST GAS TURBO-SUPERCHARGER

BACKGROUND OF THE INVENTION

1. Field of the Invention

This invention relates to an exhaust bypass valve assembly for closing and opening an exhaust bypass for controlling rotations of an exhaust gas turbo-supercharger mainly installed in a spark ignition internal combustion engine whose intake flow is controlled by a throttle valve.

2. Description of the Prior Art

It has been known to control the rotations of an exhaust gas turbo-supercharger by means of an exhaust bypass valve provided in a bypass through which part of exhaust gases passes without passing through a turbine in order to prevent a pressure upstream of a throttle valve from being extraordinarily raised by a compressor driven by the turbine.

For the purpose of controlling the exhaust bypass valve, it has been proposed to move the valve by a deforming movement of a diaphragm caused by a pressure introduced from the upstream of the throttle valve into a chamber of a diaphragm device.

Such a diaphragm device of the prior art controls the upper limit of the pressure upstream of the throttle valve, for example, at 400 mmHg. However, most of gasoline engines for automobiles are operated under partially loaded conditions during normal travelling where throttle valves are partially opened and thus exhaust gas turbo-supercharger rotate at lower speeds. When the pressure upstream of the throttle valve becomes lower than, for example, 400 mmHg in this manner, the exhaust bypass valve closes to cause all the exhaust gases to flow through the turbine, so that the turbine is forced to rotate even when the supercharging is not needed and the exhaust gas resistance would increase to lower the output and thus increase the fuel consumption.

SUMMARY OF THE INVENTION

It is therefore an object of the invention to provide an improved exhaust bypass valve assembly for an exhaust gas turbo-supercharger for controlling an exhaust bypass valve to decrease an exhaust gas resistance under a partially loaded condition.

In order to achieve this object, the exhaust bypass valve assembly for an internal combustion engine including a throttle valve downstream of a compressor of an exhaust gas turbo-supercharger for controlling intake mixture flows, a bypass causing part of exhaust gases to flow therethrough without passing through an exhaust gas turbine and an exhaust bypass valve provided in said bypass, according to the invention comprises first response means which is operated by a pressure upstream of said throttle valve to open said exhaust bypass valve to a larger extent as the pressure upstream of said throttle valve becomes higher and second response means which is operated by a pressure difference across said throttle valve to open said exhaust bypass valve to a larger extent as the pressure difference becomes larger, said first and second response means being arranged in series with a rod secured to said exhaust bypass valve, thereby closing and opening the exhaust bypass valve.

The invention will be more fully understood by referring to the following detailed specification and claims taken in connection with the appended drawings.

BRIEF DESCRIPTION OF THE DRAWINGS

FIG. 3 is one embodiment of a diaphragm device used for the exhaust bypass valve assembly according to the invention; and FIG. 4 is another embodiment of the diaphragm device for the exhaust bypass valve assembly according to the invention.

DETAILED DESCRIPTION OF THE PREFERRED EMBODIMENTS

Figure 1:
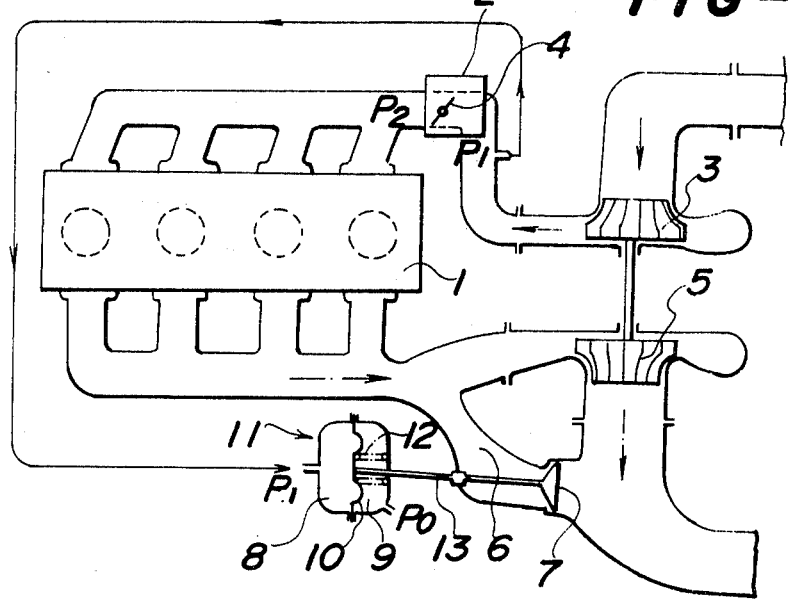
FIG. 1 is a schematic sectional view showing an exhaust bypass valve assembly of the prior art for an internal combustion engine equipped with an exhaust gas turbo-supercharger.

With a gasoline engine provided with an exhaust gas turbo-supercharger, as shown in FIG. 1, the rotation of the supercharger is controlled by an exhaust bypass valve 7 provided in an exhaust bypath 6 through which part of the exhaust gas passes without passing through a turbine 5 in order to prevent the pressure $P_1$ being extraordinarily raised upstream of a throttle valve 4 of a carburetor 2 (which is equivalent to an air passage in a fuel injection engine as described later) of an engine 1 by an action of a compressor 3 upstream of the carburetor 2.

In order to control the closing and opening of the exhaust gas bypass valve 7, as shown in FIG. 1 there has been provided with a diaphragm device 11 including a diaphragm 10 dividing a space in the device into a chamber 8 receiving the pressure $P_1$ upstream of the throttle valve 4 and a chamber 9 opening in the air or atmosphere. The deforming movement of the diaphragm 10 caused by the pressure $P_1$ upstream of the throttle valve 4 against the force of a compression spring 12 in the chamber 9 is transmitted to the exhaust bypass valve 7 by a rod 13 to open it in response to a raised pressure $P_1$.

Accordingly, such a diaphragm device 11 hitherto used only functions to restrain the upper limit of the pressure $P_1$ upstream of the throttle valve 4 for example to approximately 400 mmHg but cannot control the pressure $P_1$ lower than the upper limit value.

Gasoline engines for automobiles, however, are mostly operated under partially loaded conditions during normal travelling where throttle valves are partially opened and thus exhaust gas turbo-superchargers rotate at lower speeds. When the pressure $P_1$ upstream of the throttle valve 4 becomes lower than for example 400 mmHg in this manner, the exhaust bypass valve 7 closes to cause all the exhaust gas to flow through the turbine 5, so that the turbine 5 is forced to rotate even when the supercharging is not needed and the exhaust gas resistance would increase to lower the output and increase the fuel consumption.

Figure 2:
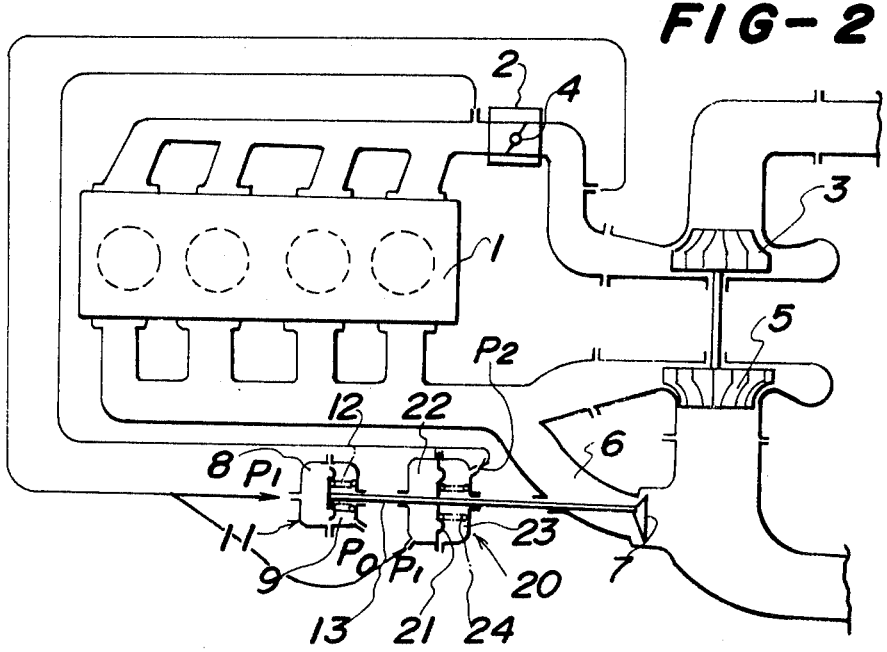
FIG. 2 is a schematic sectional view illustrating an exhaust bypass valve assembly according to the invention for an internal combustion engine equipped with an exhaust gas turbo-supercharger.

FIG. 2 illustrates one embodiment of the exhaust bypass valve assembly including a second diaphragm device 20 according to the invention. The components other than the diaphragm device 20 shown in FIG. 2 are substantially the same as those shown in FIG. 1 and the like components are designated by the same reference numerals in FIG. 2. The diaphragm device 11 is referred to as "first" diaphragm device to distinguish from the second diaphragm device 20.

The second diaphragm 20 comprises two chambers 22 and 23 divided by a diaphragm 21 connected to a rod 13 and is arranged in series with the first diaphragm device 11 with respect to an exhaust bypass valve 7. Into the chamber 22 of the second diaphragm device 20 is introduced the pressure $P_1$ upstream of a throttle valve 4 in the same manner in FIG. 1. Into the chamber 23 is introduced an intake pressure $P_2$ from a pressure extraction port formed in a manifold downstream of the throttle valve 4. A compression spring 24 is arranged in the chamber 23 to urge the diaphragm 21 in a direction for closing the exhaust bypass valve 7.

The operation of the exhaust bypass valve assembly with the diaphragm device 20 will be explained hereinafter.

When the throttle valve 4 is fully opened, the diaphragm device 20 is not operated because the pressures $P_1$ and $P_2$ upstream and downstream of the throttle valve 4 are equal, and only the diaphragm device 11 is operated in the manner above described, whose operation is independent of the extent of opening the throttle valve 4.

When the throttle valve 4 is partially opened under a partially loaded condition, the pressure $P_2$ downstream of the throttle valve 4 becomes lower than the pressure $P_1$ to be introduced into the chamber 22, so that the diaphragm 21 will deform to the right as viewed in FIG. 2 to cause the exhaust bypass valve 7 to open by means of the rod 13. If the first diaphragm device 11 has opened somewhat the exhaust bypass valve 7, the second diaphragm device 20 further opens the bypass valve.

In this manner, a pressure difference across the throttle valve 4 causes the bypass valve 7 to open to increase the bypassed exhaust gas flow with resulting less exhaust gas resistance.

Devices other than such diaphragm devices operating the exhaust bypass valve in response to the pressures upstream and downstream of the throttle valve may be used for this purpose, which would be preferred to as "response means" herein.

In practice, in order to prevent the compression spring 12 of the first diaphragm device 11 from adversely affecting the controlling action of the second diaphragm device 30, the effective area of the diaphragm of the second diaphragm device 20 may be larger or the rod 13 may be cut or separated between the diaphragms 10 and 21.

FIG. 3 shows other embodiment wherein the first and second diaphragm devices 11 and 20 are integrally formed in a unitary structure 30. The diaphragm device 30 comprises a main body consisting of upper, middle and lower casings 31, 32 and 33. Two diaphragms 34 and 35 and a partition 36 formed in the middle casing 32 divide a space in the main body into four chambers 37, 38, 39 and 40 provided with inlets 41, 42, 43 and 44, respectively. A rod 45 is fixed to the diaphragms 34 and 35 and extends through the partition 36 and the lower casing 33 in an air-tight manner. The rod 45 corresponds to the rod 13 in FIG. 2 and is incorporated in an engine to open the exhaust bypass valve 7 when the rod moves downwardly as viewed in FIG. 3. In the chamber 40 is provided a compression spring 46 having functions identical with those of the above described compression springs 12 and 24.

The pressure $P_1$ upstream of the throttle valve is communicated with the inlets 41 and 43, the atmospheric pressure $P_0$ with the inlet 42 and the engine intake pressure $P_2$ with the inlet 44. With this arrangement, it should be clearly understood that the difference pressure across the throttle valve can control the opening of the exhaust bypass valve 7 as well as the upper limit of the pressure $P_1$ upstream of the throttle valve because the chambers 37, 38, 39 and 40 correspond to the chambers 8, 9, 22 and 23, respectively.

FIG. 4 illustrates a further embodiment including less diaphragm and chambers. The diaphragm device 50 shown in FIG. 4 comprises a main body consisting of upper and lower casing 51 and 52. The lower casing 52 has a reduced diameter portion within which is slidably arranged a cylindrical partition 53 fixed to a diaphragm 54, thereby forming a chamber 55 over the diaphragm 54 and chambers 56 and 57 out of and in the cylindrical partition 53 under the diaphragm 54. Inlets 58, 59 and 60 are formed in the chambers 55, 56 and 57, respectively. To the diaphragm 54 is fixed a rod 61 corresponding to the rod 45 above described. In the chamber 57 is arranged a compression spring 62 equivalent to the compression spring 46 above mentioned.

The diaphragm device 50 can achieve the same functions as of the embodiments above described by selecting effective areas of the diaphragm in the chambers and introducing the upstream and downstream pressures $P_1$ and $P_2$ of the throttle valve and the atmospheric pressure $P_0$ into these chambers.

The embodiments of the exhaust bypass valve assembly applied to the carburetors have been explained. The invention may be applied to an engine including fuel injection valves in branches of an intake manifold.

As can be seen from the above explanation, the exhaust bypass valve assembly according to the invention has advantages in that the exhaust bypass valve is opened by the difference pressure across the throttle valve, thereby rendering smooth the exhaust gas flow under partially loaded conditions to improve the combustion of mixtures, and the assembly can easily be applied to existing engines.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An exhaust bypass valve assembly for an internal combustion engine including a throttle valve downstream of a compressor of an exhaust gas turbo-supercharger for controlling intake mixture flows, a bypass causing part of exhaust gases to flow therethrough without passing through an exhaust gas turbine and an exhaust bypass valve provided in said bypass, comprising first response means which is operated by a pressure upstream of said throttle valve to open said exhaust bypass valve to a larger extent as the pressure upstream of said throttle valve becomes higher and second response means which is operated by a pressure difference across said throttle valve to open said exhaust bypass valve to a larger extent as the pressure difference becomes larger, said first and second response means being arranged in series with a rod secured to said exhaust bypass valve, thereby closing and opening the exhaust bypass valve.

2. An exhaust bypass valve assembly for an exhaust gas turbo-supercharger as set forth in claim 1, wherein said first response means comprises a diaphragm connected to said rod and urged by a compression spring in a direction closing said bypass valve, and two chambers on both sides of the diaphragm, one of said chambers receiving the pressure upstream of said throttle valve and the other chamber opening in the atomsphere, and said second response means comprises a diaphragm connected to said rod and urged by a compression spring in the direction closing said bypass valve, and two chambers on both sides of the diaphragm, one of said chambers receiving the pressure upstream of said throttle valve and the other chamber receiving a pressure downstream of said throttle valve.

3. An exhaust bypass valve assembly for an exhaust gas turbo-supercharger as set forth in claim 1, wherein said first and second response means are integrally formed in a unitary structure comprising a casing including therein two diaphragms and a partition therebetween to form chambers on both sides of said two diaphragms, and the chambers on the sides of one diaphragm receiving said pressure upstream of said throttle valve and opening in the atmosphere, respectively, and the chambers on the sides of the other diaphragm receiving pressures upstream and downstream of said throttle valve, respectively.

4. An exhaust bypass valve assembly for an exhaust gas turbo-supercharger as set forth in claim 1, wherein said first and second response means are integrally formed in a unitary structure, said structure comprising a main body consisting of upper, middle and lower casing, two diaphragms and a partition formed in said middle casing to divide a space in said main body into four chambers provided with respective inlets, said rod being fixed to said diaphragms and extending through said partition and said lower casing in an air-tight manner, and a compression spring urging said diaphragm in a direction closing said bypass valve, and said chambers on both sides of one diaphragm receiving said pressure upstream of said throttle valve and opening in the atmosphere, respectively, and said chambers on both sides of the other diaphragm receiving pressures upstream and downstream of said throttle valve, respectively.

5. An exhaust bypass valve assembly for an exhaust gas turbo-supercharger as set forth in claim 1, wherein said first and second response means are integrally formed in a unitary structure comprising a casing including one diaphragm to form chambers on both sides of the diaphragm, part of said casing forming said one chamber being reduced, and a cylindrical partition slidable within said reduced portion of said casing, said cylindrical partition being fixed to said diaphragm to divide said one chamber into inner and outer chambers in and out of said cylindrical partition, and said chamber on opposite side of said one chamber, said inner and outer chambers receiving the pressure upstream of said throttle valve, the atmospheric pressure and a pressure downstream of said throttle valve.

6. An exhaust bypass valve assembly for an exhaust gas turbo-supercharger as set forth in claim 5, wherein said rod being fixed to said diaphragm and extending through said casing, and a compression spring is arranged in said inner chamber to urge said diaphragm in a direction closing said bypass valve.

* * * * *